(12) United States Patent
Dumitras et al.

(10) Patent No.: US 7,606,435 B1
(45) Date of Patent: Oct. 20, 2009

(54) SYSTEM AND METHOD FOR ENCODING AND DECODING USING TEXTURE REPLACEMENT

(75) Inventors: Adriana Dumitras, Sunnyvale, CA (US); Barin Geoffry Haskell, Mountain View, CA (US)

(73) Assignee: AT&T Intellectual Property II, L.P., New York, NY (US)

( * ) Notice: Subject to any disclaimer, the term of this patent is extended or adjusted under 35 U.S.C. 154(b) by 729 days.

(21) Appl. No.: 10/237,488

(22) Filed: Sep. 9, 2002

Related U.S. Application Data

(60) Provisional application No. 60/360,027, filed on Feb. 21, 2002.

(51) Int. Cl.
*G06K 9/36* (2006.01)
*G06K 9/46* (2006.01)
*G06K 9/66* (2006.01)

(52) U.S. Cl. ..................... 382/243; 382/190
(58) Field of Classification Search ................. 382/108, 382/166, 190, 192, 199, 203, 204, 206, 232, 382/233, 243, 246, 254, 162, 164; 345/427, 345/582, 583, 587, 600, 605, 619, 689; 348/571; 375/240.24
See application file for complete search history.

(56) References Cited

U.S. PATENT DOCUMENTS

| | | | | |
|---|---|---|---|---|
| 5,097,427 A | * | 3/1992 | Lathrop et al. | 345/587 |
| 5,204,920 A | * | 4/1993 | Moran et al. | 382/166 |
| 5,533,140 A | * | 7/1996 | Sirat et al. | 382/108 |
| 5,680,475 A | | 10/1997 | Zwierski et al. | |
| 5,872,867 A | * | 2/1999 | Bergen | 382/254 |
| 5,926,575 A | | 7/1999 | Ohzeki et al. | |
| 5,946,419 A | * | 8/1999 | Chen et al. | 382/243 |
| 6,647,132 B1 | * | 11/2003 | Montillo et al. | 382/108 |
| 6,768,495 B2 | * | 7/2004 | Valente | 345/619 |
| 6,977,659 B2 | * | 12/2005 | Dumitras et al. | 345/582 |

OTHER PUBLICATIONS

"Video Coding for Low Bit Rate Communication, H.263", Feb. 1998, *ITU-T Recommendation H.263*, Series H: Audiovisual and Multimedia systems, Infrastructure of audio Visual Services—Coding of Moving Video.
H. G. Musmann, et al., "Object-oriented Analysis-synthesis Coding of Moving Images," *Signal Processing: Image Communication*, vol. 1, No. 2, pp. 117-138, Nov. 1989.
D. E. Pearson, "Developments in Model-Based Video Coding", *Proceedings of IEEE*, vol. 83, No. 6, pp. 892-906, Jun. 1995.
P. Gerken, "Object-based Analysis-synthesis Coding of Image Sequences at Very Low bit Rates," *IEEE Trans. on Circuits and Systems for Video Technology*, vol. 4, No. 3, pp. 228-235, Jun. 1994.

(Continued)

*Primary Examiner*—Amir Alavi

(57) ABSTRACT

The invention provides devices and methods that process images. The invention processes a received signal representing information of texture and information of an image, which has the texture removed from at least one region. The image information is encoded to obtain encoded information of the image. An output signal is generated representing the texture information and the encoded image information. In another embodiment, the invention synthesizes texture based on the received texture information, decodes received image information, which is encoded, to obtain a decoded image, and then maps the synthesized texture onto the decoded image.

6 Claims, 8 Drawing Sheets

OTHER PUBLICATIONS

M. Hotter, "Optimization and Efficiency of an Object-oriented Analysis-synthesis Coder," *IEEE Trans. on Circuits and Systems for Video Technology*, vol. 4, No. 2, pp. 181-194, Apr. 1994.

A. Kaup, "Object-based Texture Coding of Moving Video in MPEG-4," *IEEE Trans. on Circuits and Systems for Video Technology*, vol. 9, No. 1, pp. 5-15, Feb. 1999.

J. Ostermann, et al., "Source Models for Content-based Video Coding", in *Proceedings of IEEE International Conference on Image Processing*, 2000, vol. 3, pp. 62-65.

J. Osterman, et al., Difference Between an Object-based Analysis-synthesis Coder and a Block-based ybrid Coder, in *Proceedings of IEEE International Conference on Image Processing*, 1995, vol. 2, pp. 398-401.

S. Hao, et al., "Smoothing Algorithms for Clip-and-Paste Model-Based Video Coding," pp. 427-435, 1999.

K. Fan, et al., "An Active Scene Analysis-based Approach for Pseudoconstant Bit-rate Video Coding," *IEEE Trans. on Circuits and Systems for Video Technology*, vol. 8, No. 2, pp. 159-170, Apr. 1998.

A. M. Dawood, et al., "MPEG Video Modelling Based on Scene Description," in *Proceedings of IEEE International Conference on Image Processing*, 1998, vol. 2, pp. 351-355.

A. Smolic, et al., "Long-term Global Motion Estimation and Its Application for Sprite Coding, Content Description and Segmentation," *IEEE Trans. on Circuits and Systems for Video Technology*, vol. 9, No. 8, pp. 1227-1242, Dec. 1999.

M. Irani, et al., "Video Indexing Based on Mosaic Representations", *Proceedings of IEEE*, pp. 905-921, May 2000.

H. Nicolas, "New Methods for Dynamic Mosaicking," *IEEE Transactions on Image Processing*, vol. 10, No. 8, pp. 1239-1251, Aug. 2001.

R. S. Jasinschi, et al., "Content-based Video Sequence Representation," in *Proceedings of IEEE International Cofnerence on Image Processing*, 1995, vol. 2, pp. 229-232.

T. Ebrahimi, et al., "Visual Data Compression for Multimedia Applications," *Proceedings of IEEE*, vol. 86, No. 6, pp. 1109, 1125, Jun. 1998.

T. Chen, et al., "Coding of Subregions for content-based Scalable Video", *IEEE Trans. on Circuits and Systems for Video Technology*, vol. 7, No. 1, pp. 256-260, Feb. 1997.

P. Campisi, et al., "A Perceptually Lossless, Model-based, Texture Compression Technique," *IEEE Transactions on Image Processing*, vol. 9 No. 8, pp. 1325-1336, Aug. 2000.

P. P. Raghu, et al., "Segmentation of Gabor-filtered Textures Using Deterministic Relaxation," *IEEE Trans. on Image Processing*, vol. 5, No. 12, pp. 1625-1636, Dec. 1996.

Y. Chen, "Novel Techniques for Image Texture Classification," *Ph.D. thesis*, Dept. of Electronics and Computer Science, Faculty of Engineering and Applied Science, University of Southampton, UK, 1995.

R. M. Haralick, et al., "Textural Features for Image Classification," *IEEE Trans. on Systems, Man and Cybernetics*, vol. SMC-3, No. 6, pp. 610-621, Nov. 1973.

A. K. Jain, et al., "Learning Texture Discrimination Masks," *IEEE Trans. on Pattern Analysis and Machine Intelligence*, vol. 18, No. 2, pp. 195-205, Feb. 1996.

W. Y. Ma, et al., "Texture Features and Learning Similarity," in *Proceedings of the IEEE Int. Conference on Computer Vision and Pattern Recognition*, San Francisco, CA, 1996.

T. Hall, et al., "Bispectral Analysis and Model Validation of Texture Images," *IEEE Transactions on Image Processing*, vol. 4, No. 7, pp. 996-1009, Jul. 1995.

M. Unser, "Texture Classification and Segmentation Using Wavelet Frames," *IEEE Transactions on Image Processing*, vol. 4, No. 11, pp. 1549-1560, Nov. 1995.

J. Mao, et al., Texture Classification and Segmentation Using Multiresolution Simultaneous Autoregressive Models, *Pattern Recognition*, vol. 25, No. 2, pp. 173-188, 1992.

A. C. Bovik, et al., "Multichannel Texture Analysis Using localized Spatial Filters," *IEEE Transactions on Pattern Analysis and Machine Intelligence*, vol. 12, pp. 55-73, 190.

A. K. Jain, et al., "Unsupervised Texture Segmentation Using Gabor Filters," *Pattern Recognition*, vol. 124, pp. 1167-1186, 1991.

B. S. Manjunath, et al., "Texture Features for Browsing and Retrieval of Image Data," *IEEE Transactions on Pattern Analysis and Machine Intelligence*, vol. 18, pp. 837-842.

A. Jain, et al., "A Multiscale Representation Including Opponent Color Features for Texture Recognition," *IEEE Transactions on Image Processing*, pp. 124-128, Jan. 1998.

D. J. Heeger, et al., "Pyramid-based Texture Analysis/Synthesis," in *Proceedings of SIGGRAPH'95*, 1995.

J. S. Debonet, "Multiresolution Sampling Procedure for Analysis and Synthesis of Texture Images," in *Proceedings of SIGGRAPH'97*, 1997.

A. A. Efros, et al., "Texture Synthesis by Non-parametric Sampling," in *Proceedings of IEEE International Conference on Computer Vision*, Corfu, Greece, 1999.

J. Portilla, et al., "A Parametric Texture Model Based on Joint Statistics of Complex Wavelet Coefficients," *International Journal of Computer Vision*, vol. 40, No. 1, pp. 49-71, 2000.

Y. Xu, et al., "Chaos Mosaic: Fast and Memory Efficient Texture Synthesis," *Technical Report MSR-TR-2000-32, Microsoft Research*, USA, Apr. 2000.

Z. Bar-Joseph, et al., "Texture Mixing and Texture Movie Synthesis Using Statistical Learning," *IEEE Transactions on Visualization and Computer Graphic*, vol. 7, No. 2, pp. 120-135, Apr.-Jun. 2001.

H. Greenspan, et al., "Rotation Invariant Texture Recognition Using a Steerable Pyramid," in *Proceedings of IEEE International Conference on Pattern Recognition: Computer Vision and Image Processing*, 1994, vol. 2, pp. 162-167.

H. Greenspan, et al., "Overcomplete Steerable Pyramid Filters and Rotation Invariance," in *Proceedings of IEEE International Conference on Computer vision and Pattern Recognition*, 1994, pp. 222-228.

R. Manduchi, et al., "Pyramidal Implementation of Deformable Kernels," in *Proceedings of IEEE International Conference on Image Processing*, 1995, vol. 1, pp. 378-381.

W. T. Freeman, et al., "The design and Use of Steerable Filters," *IEEE Transactions on Pattern Analysis and Machine Intelligence*, vol. 13, No. 9, pp. 891-906, 1991.

J. A. Cadzow, et al., "Image Texture Synthesis-by-analysis Using Moving-average Models," *IEEE Transactions on Aerospace and Electronic Systems*, vol. 29, No. 4, pp. 1110-1122, Oct. 1993.

G. Jacovitti, et al., "Texture Synthesis-by-analysis with Hardlimited Gaussian Processes," *IEEE Transactions on Image Processing*, vol. 7, No. 11, pp. 1615-1621, Nov. 1998.

P. Campisi, et al., "Reduced Complexity Modeling and Reproduction of Colored Textures," *IEEE Transactions on Image Processing*, vol. 9, No. 3, pp. 510-518, Mar. 2000.

Z. Bar-Joseph, et al., "Statistical Learning of Multi-dimensional Textures," *Master's Thesis*, Institute of Computer Science, The Hebrew University of Jerusalem, Israel, Apr. 1999.

M. O. Szummer, "Temporal Texture Modeling," *Master's Thesis*, Electrical Engineering and Computer Science Department, Massachusetts Institute of Technology, USA, Sep. 2001.

A. Schodl, et al., "Video Textures," in preprint, 2001.

A. Dumitras, et al., "Angular Map-driven Snakes with Application to Object Shape Description in Color Images," accepted for publication in *IEEE Transactions on Image Processing*, 2001.

A. Dumitras, et al., "Color Image-based Angular Map-driven Snakes," in *Proceedings of IEEE International Conference on Image Processing*, Thessaloniki, Greece, Oct. 2001.

Y. Fu, et al., "Occlusion Adaptive Motion Snake," in *Proceedings of IEEE International Conference on Image Processing*, 1998, vol. 3, pp. 633-637.

A. Mojsilovic, et al., "The Vocabulary and Grammar of Color Patterns", *IEEE Transactions on Image Processing*, vol. 9, No. 3, pp. 417-431, Mar. 2000.

A. Mojsilovic, et al., "Matching and Retrieval Based on Vocabulary and Grammar of Color Patterns," *IEEE Transactions on Image Processing*, vol. 9, No. 1, pp. 38-54, Jan. 2000.

G. Qui, "Pattern Colour Separable Image Coding for Content-based Indexing," in *Proceedings of IEEE Workshop on Multimedia Signal Processing*, 1999, pp. 407-412.

M. M. Gorkani, et al., "Texture Orientations for Sorting Photos 'at a glance'," in *Proceedings of IAPR Conference on Pattern Recognitions*, Jerusalem, Israel, 1994, vol. 1, pp. 459-464.

A. Ravishankar Rao, et al., "Computing Oriented Texture Fields," in *Proceedings of IEEE International Conference on Computer Vision and Pattern Recognition*, 1989, pp. 61-68.

\* cited by examiner

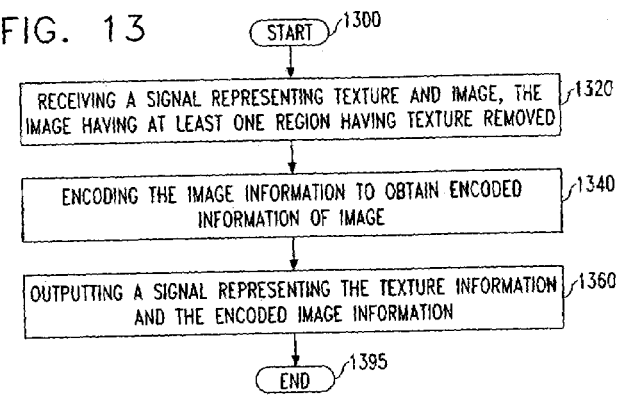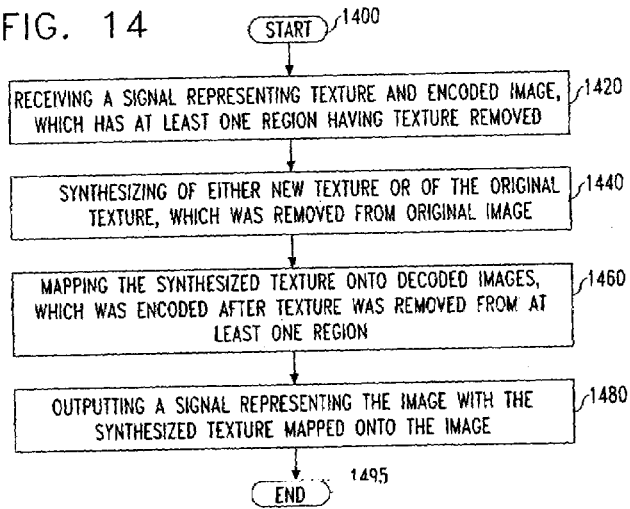

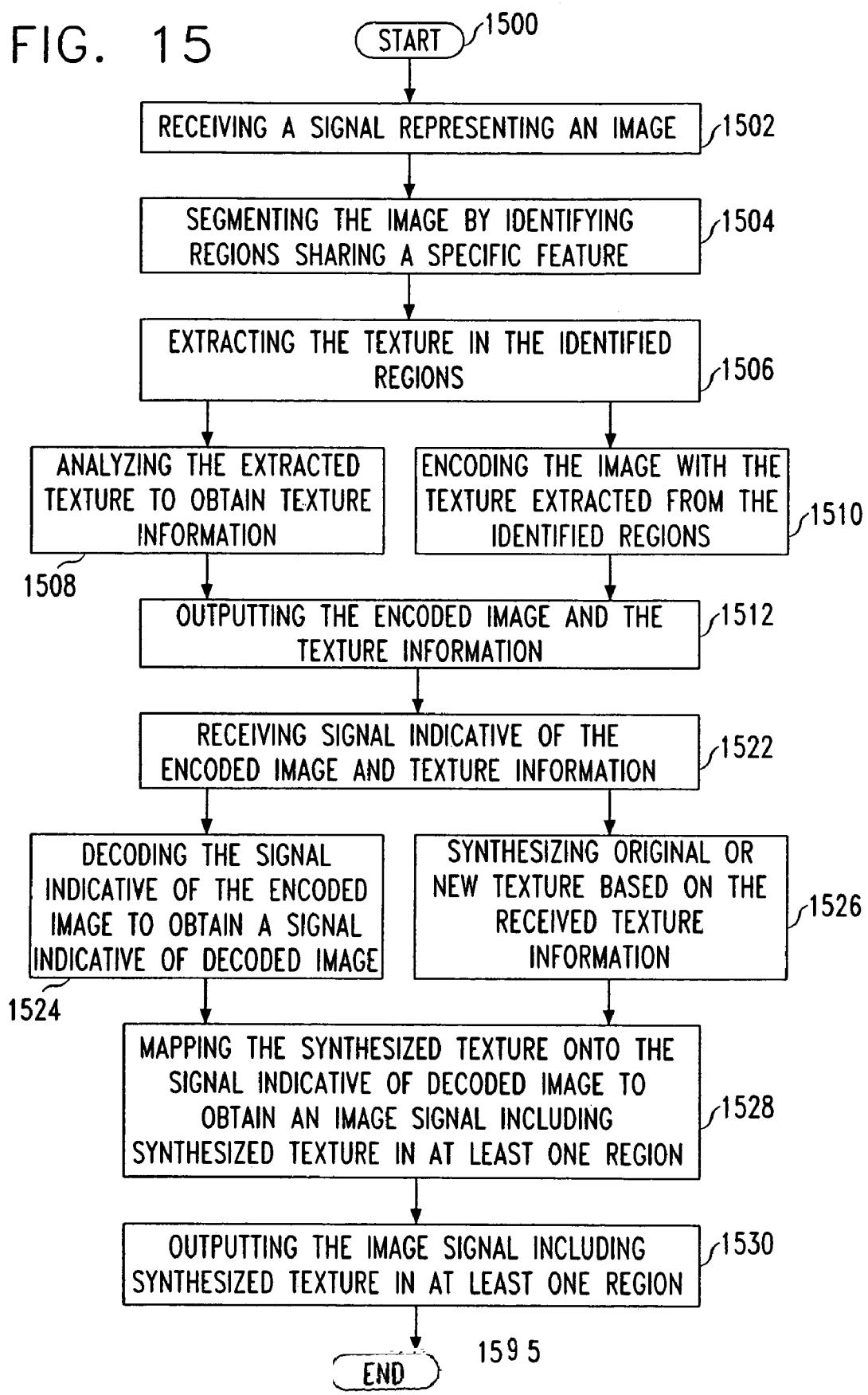

SYSTEM AND METHOD FOR ENCODING AND DECODING USING TEXTURE REPLACEMENT

This non-provisional application claims the benefit of U.S. provisional Application No. 60/360,027 entitled "An Encoder-Decoder Texture Replacement Method with Application to Content-Based Movie Coding" filed on Feb. 21, 2002. The Applicants of the provisional application are Adriana Dumitras and Barin Geoffry Haskell. The above provisional application is hereby incorporated by reference including all references cited therein.

RELATED APPLICATIONS

This application is related to commonly assigned U.S. patent application Ser. No. 10/237,489 entitled "Texture Replacement In Video Sequences And Images," filed Sep. 9, 2002 by Adriana Dumitras and Barin Geoffry Haskell and which claims priority to U.S. provisional Application No. 60/328,627, filed Oct. 11, 2001. This above-identified application is incorporated by reference herewith.

BACKGROUND OF THE INVENTION

1. Field of the Invention

This invention relates to image and video processing. More particularly, this invention relates to image and video processing systems and methods that use texture replacement in encoding and decoding.

2. Description of Related Art

Increased popularity of movie-on-demand (MoD) and near movie-on-demand (NMoD) services, which allow the user to watch any movie at any time and make use of VCR-like functionalities, makes them important applications of movie coding. The success of MoD and NMoD in movie production, distribution, and consumer markets depends, however, on both the efficient transmission of encoded movies and the obtaining of very high quality decoded images (including, but not limited to, pictures or movie frames). The economical and technical challenges of this task are considerable. For commercial viability, MoD and NMoD service pricing must compete with existing movie rental pricing. The cost of MoD delivery services is often prohibitive because of the need to reserve a dedicated channel at a video server for each user and the need for large bandwidth to handle the compressed high quality movie sequences.

To address the need to reserve a dedicated channel for each user, NMoD systems use broadcast or multicast technologies to enable multiple users to share a single video channel. This approach, however, results in limited movie selections, fixed playback schedules, and limited or no interactive control.

To address the need for large bandwidth, movies may be transmitted over existing higher bandwidth networks, such as Digital Subscriber Lines (DSL). This approach, however, results in limited bandwidth because a DSL-based technology, such as Asynchonous DSL (ADSL), limits transmission to a bit rate of approximately 500 kbits/second for 95% of the existing loops and therefore requires that compressed movie sequences be transmitted at lower bit rates to accommodate the bandwidths of most ADSL users.

State-of-art video coding systems that are compliant with existing MPEG and ITU standards can provide bit rates of hundreds of kbits/second in the compressed video streams. However, providing such bit rates comes at a cost of compromising the visual quality of the decoded movies. For example, encoding an original sequence of the movie entitled "6 DAYS AND 7 NIGHTS" using the H.26L codec, which is an emerging standard and an offspring of the ITU H.263 family of low bit rate standards, results in a bit rate of the compressed movie sequence being equal to about 242 kbits/second. However, the decoded frame of the movie sequence exhibits artifacts, as compared to the original frame, that are particularly visible in large textured areas. Accordingly, the visual quality of such a decoded sequence would not be acceptable for entertainment MoD or NMoD services.

SUMMARY OF THE INVENTION

The invention provides devices and methods that readily meet the bit rate and visual quality requirements. The disclosed invention leads to encoding and decoding devices and methods that enable sub-500 Kbit/sec bit rates while being free from unacceptable visual degradation.

In its most basic form, the invention can be implemented as a device including a component providing texture information and an encoder that encodes images having regions wherein the texture is removed; as a device that can further include a component providing texture information and a decoder that decodes encoded images having regions wherein the texture is removed; and as a system including a component providing texture information, an encoder that encodes images having regions wherein the texture is removed, and a decoder that decodes encoded images having regions wherein the texture is removed.

Alternatively, in its most basic form, the invention is a method including providing texture information and encoding images having regions wherein the texture is removed; a method including providing texture information and decoding encoded images having regions wherein the texture is removed; and a method including providing texture information, encoding images having regions wherein the texture is removed, and decoding encoded images having regions wherein the texture is removed.

In one exemplary embodiment, similar texture regions in movie sequences are identified; the texture is extracted and analyzed to obtain sequences with the texture removed, and the texture parameters; and sequences with the texture removed are then encoded. This enables the sequences with the texture removed and texture parameters to be encoded using low bit-rate coding approaches without causing subsequent visual degradation.

In another exemplary embodiment, the contours of the regions with the texture removed are recovered using decoded frames of sequences with the texture removed; new texture is synthesized using the obtained texture parameters; and the synthesized texture is mapped onto the recovered regions to obtain a reconstructed representation of the movie sequences. This enables the sequences with the texture removed and texture parameters to be decoded using low bit-rate coding approaches without resulting in visual degradation in the sequences with mapped texture.

In yet another exemplary embodiment, similar texture regions in movie sequences are identified; texture is extracted and analyzed to obtain texture-removed sequences and texture parameters; and the sequences with the texture removed are encoded. This is followed by using decoded frames of sequences with the texture removed to recover the contours of the texture-removed regions, using the obtained texture parameters to synthesize new textures, and mapping the synthesized texture onto the recovered regions to obtain a reconstructed representation of the movie sequences. This enables using low bit-rate coding approaches without attendant visual degradation.

These and other features and advantages of this invention are described in, or are apparent from, the following detailed description of the systems and methods according to exemplary embodiments of this invention.

The advantages of the herein disclosed invention are manifold. First, the bit rate in the compressed stream is significantly reduced. This advantage results because the bit rates of intra-coded (I), predicted (P), and bidirectionally predicted (B) images depend on, or are influenced by, texture content of such images. This advantage also results because the texture-removed images can be coded without having to code region shape parameters.

Second, the visual quality of the textured background regions is higher in images with synthesized texture at the decoder as compared to the visual quality of images that are simply encoded and decoded, because the synthesized and mapped texture at the decoder does not contain coding artifacts.

Third, the effectiveness of texture removal at the encoder and the texture replacement at the decoder is high for large classes of textured regions, as well as efficient in terms of speed. This advantage is especially important for real-time decoding purposes.

Finally, the inventive approach is independent of the selection of a particular codec. Consequently, the inventive approach can be applied as an overlay onto any standards-compliant coding system.

These and other features and advantages of this invention are described in, or are apparent from, the following detailed description of the systems and methods according to exemplary embodiments of this invention.

BRIEF DESCRIPTION OF THE DRAWINGS

The benefits of the present invention will be readily appreciated and understood from consideration of the following detailed description of exemplary embodiments of this invention, when taken together with the accompanying drawings, in which:

FIG. 13 is a flowchart depicting the steps of a first exemplary method in accordance with the present invention;

FIG. 14 is a flowchart depicting the steps of a second exemplary method in accordance with the present invention; and FIG. 15 is a flowchart depicting the steps of a third exemplary method in accordance with the present invention.

DETAILED DESCRIPTION OF PREFERRED EMBODIMENTS

For the purpose of this application, the term "image" has a scope including, but not limited to, a still picture, a single video frame, or a sequence of video frames. For the purposes of this application, texture of an object in an image is a spatial visual characteristic of the image objects. Texture consists of texture primitives or texture elements, also called texels. The appearance and spatial placement of the texels determine the visual "look" (i.e., coarse, fine, grained, smooth, . . . etc.) of the texture. For example, in an image showing an oasis and a region of desert around the oasis, the texture of the desert region will look different from the texture of the oasis region because of the relative difference in the sizes of the grains of sand and leaves, which form the components of the desert and the oasis, respectively. Texture description can be scale-dependent and can be, but is not limited to being, described at various resolutions using pyramidal decompositions.

Figure 1:
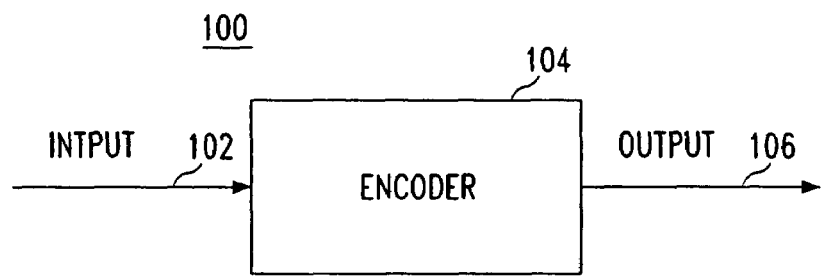
FIG. 1 is a block diagram of an exemplary device in accordance with a first embodiment.

FIG. 1 is a block diagram showing an exemplary implementation of the invention as apparatus 100. The apparatus 100 can include an input 102 for receiving a signal, an encoder 104 for encoding at least part of the signal, and an output 106 for outputting an output signal.

During operation, the apparatus 100 can receive at input 102 a signal representing texture information and movie frames, which have the texture removed from at least one region. The removal of texture from at least one region of the movie frames could have been accomplished by, but not limited to, processing the original movie frames by region segmentation and texture extraction. The texture information could have been obtained by, but not limited to, analyzing the removed texture from the original movie frames.

The encoder 104 is operatively connected to the input 102, from which it receives the input signal. In this implementation, the encoder 104 is operatively arranged to encode the movie frame portion of the input signal. The encoding can include, but is not limited to, transforming the movie frames, quantizing the result of the transformation, and performing fixed or variable length encoding. In another implementation, the encoder is operatively arranged to encode the texture information in addition to the movie frames.

The output 106 is operatively connected to the encoder 104. In an exemplary implementation, the output signal can be a single packet combining the encoded movie frames and the texture information, either encoded or non-encoded. Alternatively, the signal can be outputted through plural channels separately providing the encoded movie frames and the texture information, either encoded or non-encoded.

The signal outputted by output 106 can be further processed by other devices or systems. For example, the output signal can be transmitted through a communication medium (including but not limited to a link or a network) to decoding apparatus. Alternatively, the output signal can be conveyed to a storage medium.

In various exemplary implementations, apparatus 100 can include one or more components implementing region segmentation, texture extraction, or analysis of the texture removed from the original movie frames, or implementing a combination of two or more of these functions.

Figure 2:
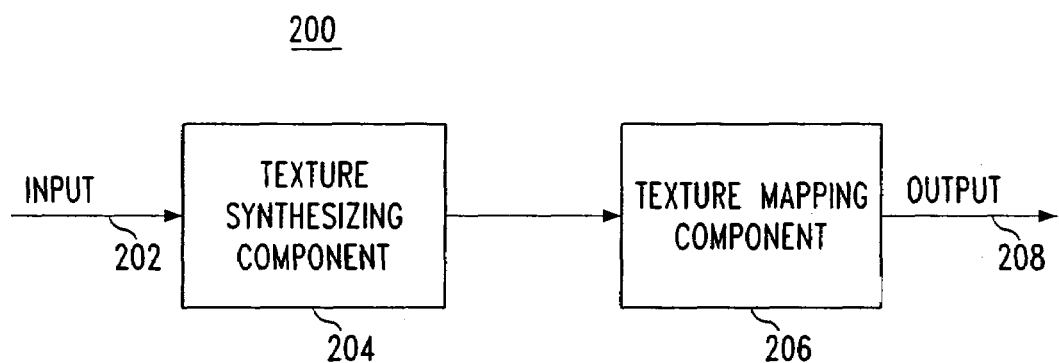
FIG. 2 is a block diagram of an exemplary device in accordance with a second embodiment.

FIG. 2 is a block diagram showing an exemplary implementation of the invention as apparatus 200. The apparatus 200 can include an input 202 receiving a signal, a texture synthesizing component 204, a texture mapping component 206, and an output 208 outputting an output signal.

During operation, the apparatus 200 can receive at input 202 a signal representing texture information and encoded movie frames, which have the texture removed from at least one region. The removal of texture from at least one region of the movie frames could have been accomplished by, but not limited to, processing the original movie frames by region segmentation and texture extraction. The texture information could have been obtained by, but not limited to, analyzing the texture removed from the original movie frames. The received signal can be a single packet combining the encoded movie frames and the texture information, which is either encoded or non-encoded. Alternatively, the input signal can be received through plural channels separately providing the encoded movie frames and the texture information, either encoded or non-encoded.

The texture synthesizing component 204 is operatively connected to the input 202, from which it receives the input signal. The texture synthesizing component 204 is operatively arranged to synthesize texture that can be either different from or similar to the original texture, which was removed from original movie frames. In various exemplary implementations, the texture synthesizing component 204 can be operatively arranged to synthesize texture based on at least one reference constraint (pre-set or dynamically set), including, but not limited to, for example marginal statistics, coefficient correlations, coefficient magnitude correlations, cross-scale statistics, overall color, and color saturation constraints and any combination of two or more of these constraints. Additionally, in various exemplary implementations, the texture synthesizing component 204 can also decode encoded texture information received from input 202 in addition to synthesizing the texture.

The texture mapping component 206 is operatively connected to the texture synthesizing component 204. The texture mapping component 208 is operatively arranged to map the texture produced by the texture synthesizing component 204 onto decoded movie frames that were encoded after texture was removed from at least one region. The decoding of the movie frames could have included, but is not limited to, performing fixed or variable length decoding and inverse transformation.

The output 208 is operatively connected to the texture mapping component 206. In various exemplary implementations, the output 208 can provide the signal resulting from the texture mapping component 206 for further processing including, but not limited to, displaying movie frames based on the output of the texture mapping component 206.

In various exemplary implementations, the apparatus 200 can include a decoder (not shown) that is operatively arranged to decode movie frames that were encoded after texture was removed from at least one region. In such implementations, the input 202 can be operatively arranged to receive encoded movie frames and provide them to the decoder, and the decoder can be operatively connected to the texture mapping component 206, which would be provided the decoded movie frames. In various exemplary implementations, such a decoder can also be operatively arranged to decode encoded texture information, which decoded texture information would be provided to the texture synthesizing component 204. In these implementations, the decoder can be operatively arranged to include, but is not limited to, performing fixed or variable length decoding and inverse transformation.

Various exemplary systems implementing the invention can combine the various implementations of apparatuses 100 and 200 in different manners to enable one-way or two-way, real-time or delayed data transmission and reception. For example, the invention can be implemented in the form of a transceiver combining in a single apparatus (including, but not limited to, combining in an integrated manner) an apparatus 100 and an apparatus 200. Such a transceiver can be used to connect to other transceivers through communication media that include links or networks, or both. Such transceivers can be used for real time communication of data packets or for communication delayed by storing and later providing the data packets.

Figure 3A:
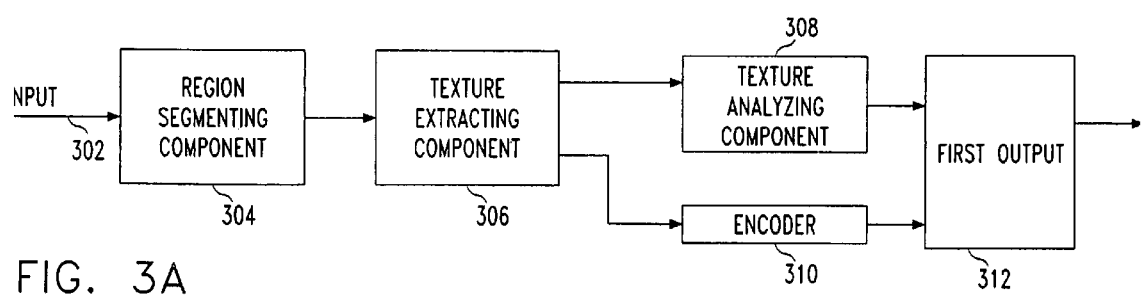
FIG. 3 is a block diagram of an exemplary device in accordance with a third embodiment.
Figure 3B:
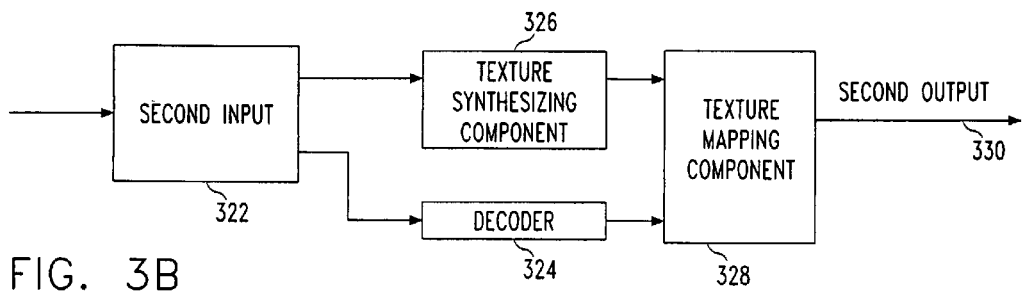

FIG. 3 is a block diagram showing an exemplary implementation of the invention as system 300. The system 300 can include a first input 302 receiving a signal, a region segmenting component 304, a texture extracting component 306, a texture analyzing component 308, an encoder 310, a first output 312, a second input 322, a decoder 324, a texture synthesizing component 326, a texture mapping component 328, and a second output 330.

During operation, the apparatus 300 can receive at the first input 302 a signal representing movie frames. The signal could be based on stored information or be based on signals obtained from an image detecting apparatus, such as, but not limited to, a camera. The input Movie signal can be represented by:

$$M_{input}\{F_k(fg_i(T,C,S,M), bg_j(T,C,S)), 1 \leq i \leq I, \ 1 \leq j \leq J, \ 1 \leq k \leq K\} \tag{1}$$

where fg and bg are foreground and background regions, respectively of a frame F; the parameters T, C, S, and M denote their texture, color, shape, and motion characteristics, respectively; and I, J, and K stand for the total number of foreground regions, background regions, and frames in the movie sequence, respectively. The input signal is provided to the region segmenting component 304, which is operatively connected to the first input 302.

The region segmenting component 304 is operatively arranged to identify the frames having regions sharing a specific feature. In an exemplary implementation, the feature is color and the region segmenting component 304 is operatively arranged to identify all background regions bg having color similar to the color of a selected pixel or region of interest. This approach can be implemented as an automated color-based region segmentation module. For example, the color characteristics are evaluated using an angular map and a modulus map of the color vectors in the RGB color space, wherein the angular map consists of the angle values between the RGB color vectors associated to each pixel in the frame with respect to a reference vector and the modulus map consists of the modulus difference values of each color vector with respect to the reference vector. This exemplary implementation is further detailed in "An encoder-only texture replacement method for effective compression of entertainment movie sequences", by A. Dumitras and B. G. Haskell, *Proceedings of the IEEE International Conference on Acous-* tics, Speech and Signal Processing (ICASSP' 2002), Orlando, Fla., May 2002 [hereinafter referred to as "Dumitras and Haskell"], explicitly incorporated herein by reference in its entirety and for all purposes.

The texture extraction component 306 is operatively connected to the region segmenting component 304. The texture extracting component 306 is operatively arranged to substitute the pixel values (including changing a single or plural pixel component values) in the background regions, which are obtained by the region segmenting component 304, with a reference value C*, which can be a constant or can vary. The resulting movie sequence with the texture removed can be represented by:

$$M_{repl} = \{F_k(fg_r(T,C,S,M), bg_p(T,C,S), bg_r(C^*,S)), \\ 1 \leq i \leq I, 1 \leq p \leq P, 1 \leq r \leq R, 1 \leq k \leq K\} \quad (2)$$

where $bg(T, C, S)_p$ and $bg(C^*, S)_r$ are background regions unmodified and modified by texture extraction, respectively, and wherein the total number of these regions equals the total number of regions in equation (1). Table 1, on the next page, summarizes, in a non-limiting manner, the methodology used in Dumitras and Haskell, which can be used in implementing the region segmenting component 304 and texture extracting component 306.

TABLE 1

Color-based region segmentation and texture removal at the encoder

For each of the selected frames
1. Convert the original frames from the YUV into the RGB color space.
   The Y frames consist of all of the pixels $\{(i, j)$ with $1 \leq i \leq M$,
   $1 \leq j \leq N\}$. The U and V frames (respectively)
   consist of all of the pixels $$\left\{(i, j) \text{ with } 1 \leq i \leq \frac{M}{2}, 1 \leq j \leq \frac{N}{2}\right\}.$$

2. Select the location of a region-of-interest (ROI) and construct a ROI at that location.
3. Filter the ROI in each of the R, G, B color planes using an averaging filter. Compute the mean vector $[\mu^R \mu^G \mu^B]$, where
   $\mu^R, \mu^G$, and $\mu^B$ are the mean values within the filtered ROI in the R, G, and B color planes, respectively.
4. Compute the angular map $\theta(i, j)$ and the modulus map $\eta(i, j)$ of the frame, which are given by $$\theta(i, j) = 1 - \frac{2}{\pi} \arccos\left(\frac{v_{(i,j)} v_{ref}}{\|v_{(i,j)}\| \|v_{ref}\|}\right)$$

and $$\eta(i, j) = 1 - \frac{\|v_{(i,j)} - v_{ref}\|}{\sqrt{3 \times 255^2}}.$$

Notations $v_{(i,j)}$ and $v_{ref}$ stand for a color vector $[R(i, j) G(i, j) B(i, j)]$ in the RGB color space, and the reference vector that is selected to be equal to $[\mu^R \mu^G \mu^B]$, respectively.
5. Compute the distance measure $d^{\theta\eta}(i, j) = \exp[-\theta(i, j) \eta(i, j)]$.
   Compute the mean distance $\mu^d = E\{d^{\theta\eta}(i, j)\}$,
   where notation E stands for a mean operator over the ROI.
6. Cluster into regions all of the pixels within the frame that satisfy the constraint $(d^{\theta\eta}(i, j) - \mu^d)^2 < c$.
7. FOR each of the regions obtained in Step 6
   Remove the isolated pixels, identify the number of regions and label the regions.
   Compute geometrical features (including at least one of area, centroid, and bounding box, or a combination thereof) for the identified regions.
   Discard any region if its area divided by the frame area is smaller than a threshold.
   Label the remaining regions.
   END TABLE 1-continued Color-based region segmentation and texture removal at the encoder 8. IF the segmentation map is acceptable, continue with the next frame and Step 4.
   ELSE GOTO Step 2.
   END
END The texture analyzing component 308 is operatively connected to the texture extracting component 306 and is arranged to obtain the parameters describing the texture before its replacement by the extracting component 306. In an exemplary implementation, the texture analyzing component 308 decomposes the texture image using a parametric statistical model, including but not limited to, the approach detailed in "A parametric texture model based on joint statistics of complex wavelet coefficients," by Javier Portilla and Eero P. Simoncelli, *International Journal of Computer Vision*, vol. 40, no. 1, pp. 49-71 (2000), explicitly incorporated herein by reference in its entirety and for all purposes [hereinafter referred to as "Portilla"].

The parametric statistical model yields an overcomplete multiscale wavelet representation using steerable pyramids. This model uses statistical texture descriptors that are based on pairs of wavelet coefficients at adjacent spatial locations, orientations and scales (in particular, the expected product of the raw coefficient pairs and the expected product of their magnitudes), pairs of coefficients at adjacent scales (the expected product of the fine scale coefficient with the phase-doubled coarse scale coefficient), marginal statistics and low-pass coefficients at different scales. Table 2, on the next page, summarizes, in a nonlimiting manner, the operations performed by such an implementation of the texture analyzing component 308. The output of the texture analyzing component 308 is connected to the first output 312. In various implementations, the texture analyzing component 308 is arranged also to encode the texture parameters obtained from the texture analyzing component 308 and provide the encoded texture parameters to the first output 312.

The encoder 310 is operatively connected to the texture extracting component 306 and is operatively arranged to encode the movie frames after they are processed by the texture extracting component 306. The encoding by the encoder 310 can include, but is not limited to, transforming the movie frames, quantizing the result of the transformation, and performing fixed or variable length encoding. The encoder 310 is operatively connected to the first output 312, which is provided the encoded movie frames.

TABLE 2

The texture analysis stage

1. Construct a steerable pyramid by recursively decomposing the texture image into a set of oriented subbands and lowpass residual band.
2. Compute statistical texture descriptors using the image decomposition.
   2.1 Compute marginal statistics descriptors at each level of the pyramid.
      The skewness and kurtosis of the partially reconstructed lowpass images at each scale
      The variance of the highpass band
      The mean variance, skewness and kurtosis
      The minimum and maximum values of the image pixels (range)

TABLE 2-continued

The texture analysis stage 2.2 Compute the autocorrelation of the lowpass images at each level of the pyramid.
2.3 Compute the correlation of the complex magnitude of pairs of coefficients at adjacent positions, orientations and scales.
  The autocorrelation of magnitude of each subband
  The cross-correlation of each subband magnitudes with those of other orientations at the same scale
  The cross-correlation of subband magnitudes with all orientations at a coarser scale
2.4 Compute the cross-correlation between the coarse scale coefficients with their complex phase doubled at all orientations, and the fine scale coefficients.

In another implementation, the encoder 310 is also connected to the texture analyzing component 308. In this implementation, the encoder 310 is arranged also to encode the texture parameters obtained from the texture analyzing component 308 and provide the encoded texture parameters to the first output 312.

The first output 312 can provide, for further processing, the encoded movie frames (which have been processed by the texture extracting component 306) and the texture parameters (whether encoded or non-encoded). Such further processing includes, but is not limited to, storing in a storage medium or transmitting through a communication medium, including free space or guided wave propagation, that forms part of a link or network, or both. The encoded movie frames and texture parameters can be provided through separate channels or can be combined to form single or plural information packets.

The second input 322 is operatively connected to the first output 312 and is arranged to receive the encoded movie frames and texture parameters to the decoder 324 and texture synthesizing component 326, respectively. The decoder 324 is operatively arranged to decode the encoded movie frames by at least performing fixed or variable length decoding and inverse transforming. In various implementations, the decoder 322 is also arranged to decode encoded texture parameters and provide them to the texture synthesizing component 326.

In this implementation, the decoder 324 is also arranged to recover the boundaries of the texture-replaced regions by, for example, identifying all background regions having a color identical to the substitution color, C*. For robustness with respect to artifacts (color changes) that may be introduced by the coding and decoding process, preferably the decoder 324 includes a portion replicating the color-based region segmentation technique employed by the region segmenting component 304. The exemplary implementation by the region segmenting component 304, however, is modified by obtaining the angular and modulus maps with respect to the substitution color vector sent by the encoder, instead of computing the angular and modulus maps with respect to a color vector representing a region-of-interest. In various alternative implementations, a component that is separate from the decoder 324 (and separate from the texture synthesizing component 326) recovers the boundaries of the texture-replaced regions. In alternative implementations, the region recovery component can form part of the texture synthesizing component 326.

The resulting movie sequence after recovery of the boundaries of the texture-replaced regions can be represented by:

$$M_{rec} = \{F_k(fg_i(T,C,S,M), bg_p(T,C,S), bg_r(C^*,S)), 1 \leq i \leq I, 1 \leq p \leq P, 1 \leq r \leq R, 1 \leq k \leq K\} \quad (3)$$

where bg stands for the recovered background region that has the texture removed. This region can be the same as, or different from, the corresponding background region that has the texture removed.

The texture synthesizing component 326 receives the texture parameters and synthesizes the original, or new, texture. In an exemplary implementation, the texture synthesizing component 326 is arranged to synthesize a texture that is then mapped onto the regions whose boundaries were recovered. The texture synthesizing component 326 can synthesize texture that is artifact-free.

In various exemplary implementations, the texture synthesizing component 326 can synthesize texture that is similar to the original texture by, for example, using the same dominant texture orientation, overall color, and color saturation. In such implementations, texture synthesizing component 326 ensures better visual quality of the mapped regions than that obtained by encoding and decoding the original movie frames, but without the inventive texture replacement approach as described herein. Alternatively, in various exemplary implementations, the texture synthesizing component 326 can synthesize texture that is different from the original texture by, for example, using at least one, or a combination of, dominant texture orientation, overall color, and color saturation that is different (pre-set or dynamically set) from that in the original texture.

In various exemplary implementations, the method proposed in Portilla, which is explicitly incorporated herein by reference in its entirety and for all purposes, is implemented. Briefly, an image containing Gaussian white noise is first decomposed using a complex steerable pyramid. Next, a recursive coarse-to-fine procedure imposes statistical constraints on the lowpass and bandpass bands while simultaneously reconstructing a lowpass image.

The texture synthesizing component 326 can be implemented using any one of constraints described herein. For example, certain constraints can be included in the synthesis process using the corresponding values of the texture parameters sent from the decoder.

The constraints using the corresponding values of the texture parameters sent from the decoder include, but are not limited to, marginal statistics constraints, which can be implemented in order to comply with Julesz's conjecture, which states that human observers in a pre-attentive (i.e., non-detailed) examination perceive textures with identical first and second order probability distributions as being identical; coefficient correlation constraints, which can be implemented in order to reproduce the periodic structures of the original texture in the synthesized texture; constraints on the auto-correlation of the partially reconstructed lowpass images, which can be implemented in order to reproduce the regularity of the original texture, as represented by oriented structures, in the synthesized texture; constraints related to the correlation of the complex magnitude of pairs of coefficients at adjacent positions, orientations, and scales, which can be implemented in order to represent structure in images; and cross-scale phase statistics constraints, which can be implemented in order to adequately represent gradients of the original texture in the synthesized texture.

Various implementations of the texture synthesizing component 326 can preferably take into account overall color constraints or color saturation constraints, or both. For example, within a region, the texture in the chrominance frames is replaced with the corresponding mean color, which is preserved since the synthesized texture is mapped only on the luminance frame. Additionally, it is noted that the synthesized texture would have the same mean color as that of the replaced region. Implementing constraints on overall color and/or color saturation aids in improving the subjective evaluation by users of the similarity in color patterns. Additionally, various exemplary implementations of the texture synthesizing component 326 preferably use a combination of any two or more of the constraints described above.

In various implementations, the texture synthesizing component 326 decodes received texture parameters information that are encoded.

The texture mapping component 328 is operatively connected to the decoder 324 and the texture synthesizing component 326. Texture mapping component 328 is operatively arranged to map the synthesized texture the recovered regions of the decoded frames. In various implementations, simple placement of the synthesized texture and blending around edges can be performed using gray level masks of the recovered regions, obtained by lowpass filtering the bi-level versions of the recovered regions. Various implementations of the texture mapping component 328 for processing frontal-parallel images can be used without meshes or mip-mapping. However, other implementations of the texture mapping component 328 can additionally employ meshes and/or mip-mapping.

The texture mapping component 328 yields a signal representing the mapped movie sequence, which can be represented by:

$$M_{map} = \{F_k(fg_i(T,C,S,M), bg_p(T,C,S), bg_r(T_{new}, C^*, S)), \\ 1 \leq i \leq I, 1 \leq p \leq P, 1 \leq r \leq R, 1 \leq k \leq K\} \quad (4)$$

where $bg_r$ and $T_{new}$ stand for the background regions with texture mapping and the synthesized texture, respectively. It is to be noted that mapping and blending can be used in order to generate mapped background regions that are identical neither to the recovered regions nor to the original regions.

The output 330 is operatively connected to the texture mapping component 328. In various exemplary implementations, the output 330 can provide the signal resulting from the texture mapping component 328 for further processing including, but not limited to, displaying movie frames based on the output of the texture mapping component 328.

Next, the video test set, the parameter values, the codec, and the evaluation indices are addressed for an exemplary and non-limiting implementation, whose performance is then described.

Several video clips were employed to evaluate the performance of the inventive concept including 200 color frames from each of the movies 6 DAYS AND 7 NIGHTS, and AMERICAN BEAUTY. The frames were represented in the YUV format, having sizes of the luminance (Y) frames be equal to 352×288 and 720×352 pixels for 6 DAYS AND 7 NIGHTS and AMERICAN BEAUTY, respectively, and the sizes of the chrominance (U and V) frames each be equal to 176×144 and 360×176 pixels, respectively.

The size of the region-of-interest that is employed in the region segmentation performed by the region segmenting component 304 and texture removal performed by the texture extracting component 306 was set equal to 7×7 pixels. The texture analysis performed by the texture analyzing component 308 and the texture synthesis performed by the texture synthesis component 326 employ steerable pyramids with 3 scales, 4 orientations and a window of a size equal to 9×9 pixels. Texture synthesis was iterated 25 times. The size of the synthesized texture was set equal to the size of the luminance frame.

The H.26L codec was employed along with three coding scenarios. In the first scenario, the first frame is intra (I) coded and the rest of the frames are predicted (P) frames. In the second scenario, every 10th frame is intra coded and the rest of the frames are predicted. In the third scenario, all of the frames are intra coded. It is to be noted, however, that the inventive concept is not limited to the H.26L codec, but rather the inventive concept can be implemented with any other coding and/or compression system, including any of the MPEG standard encoding-decoding approaches.

The effectiveness of the texture removal stage at the encoder was evaluated using the bit rate of the compressed video sequences. Additionally, the effectiveness of the region boundary recovery was evaluated using the difference between the number of recovered regions and the number of regions identified in the original frames, the average normalized surface-area of each region, the difference between the centroids of the recovered regions and the centroids of the original regions, and the normalized number of missed pixels.

The normalized surface-area was computed as the ratio between the surface-areas of each region in a decoded frame and the actual surface-area of the region identified using the original frame, wherein the surface-area of an object is defined as the total number of pixels within the actual object. The average of the normalized surface-areas for each frame was computed since not all of the regions are present in all of the frames. The normalized number of missed pixels was computed as the ratio between the number of missed pixels N in the regions present in the decoded frames and the total surface-area A of the regions in the original frames, the normalized number of the missed pixels being given by: $(\Sigma N_r)/(\Sigma A_r)$.

The effectiveness of the texture mapping component 328 was evaluated subjectively by visual inspection of the resulting sequences, objectively using the peak signal-to-noise ratio (PSNR) and the weighted signal-to-noise ratio (WSNR) as described in "The effects of a visual fidelity criterion on the encoding of images," by J. Mannos and D. Sakrison, *IEEE Trans. on Information Theory*, vol. 20, no. 4, pp. 525-535, July 1974 and "Evaluation of contrast sensitivity functions for the formulation of quality measures incorporated in halftoning algorithms," by T. Mitsa and K. Varkur, *Proc. IEEE Int. Conf. Acoust., Speech, and Signal Processing*, vol. 5, pp. 301-304, 1993, respectively, and subjectively-objectively using the noise quality measure (NQM) as described in "Image quality assessment based on a degradation model," by Niranjan Damera-Venkata et al., *IEEE Trans. on Image Processing*, vol. 9, no. 4, pp. 636-650, April 2000; these references being explicitly incorporated herein in their entirety and for all purposes. Using the PSNR, WSNR, and NQM is exemplary and optional. Various exemplary implementations of the present invention can use no or any evaluation measure, including other measure or measures that replace or augment any of PSNR, WSNR, and NQM. The values of these indices per frame can be represented by:

$$I(YUV)[dB] = (4 \times I(Y) + I(U) + I(V))/6 \quad (5)$$

where I(Y), I(U), and I(V) stand for the index values for each of the Y, U, and V frames, respectively, and the index I may be the PSNR, WSNR, or NQM.

It is to be noted that objective measures of the video sequence, such as PSNR and WSNR, allow quantitative comparisons of the results and that subjective measures of the video sequence can be meaningful to a viewer. It is to be noted, however, that these comparison criteria have limitations. For example, the PSNR and WSNR are best applied when the image is distorted by additive signal independent noise. Nonlinear distortion measures, such as NQM, fill in the gap because they yield values that indicate the subjective image quality and allow numerical comparisons of the results, even when the image distortion cannot be described by an additive signal independent noise.

Figure 4:
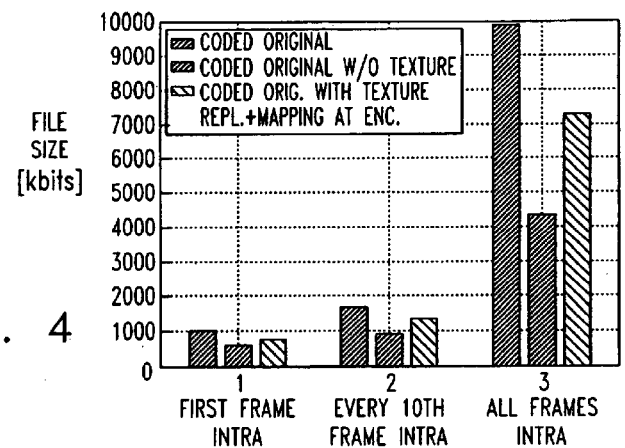
FIG. 4 is plot showing the file sizes (in kilo-bits) for 100 encoded frames of the movie sequence AMERICAN BEAUTY using three encoding scenarios.
Figure 5:
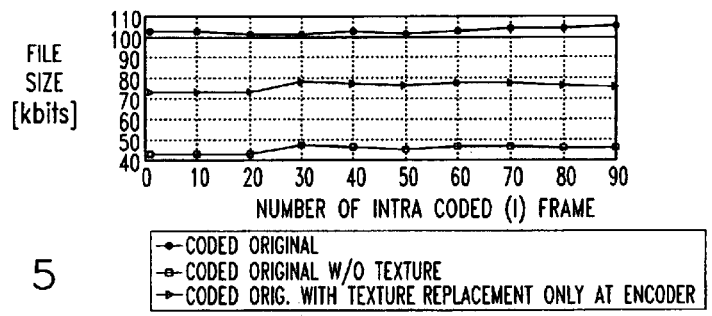
FIGS. 5 and 6 are plots showing file sizes (in kilo-bits) of the intra coded (I) original frames, original frames with texture removed, and original frames with texture replacement only at the encoder, for the movies AMERICAN BEAUTY and 6 DAYS AND 7 NIGHTS, respectively, wherein every 10th frame of the movie sequences is intra coded.
Figure 6:
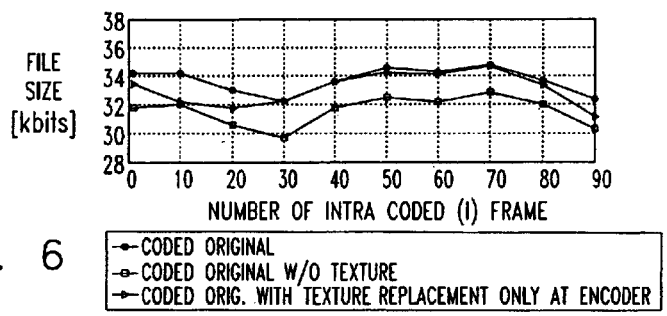

Significant bit rate reduction is achieved by implementing the inventive concept to remove the texture in regions in all of the Y, U, and V frames with pixels that have constant values (and which value is equal to the mean color of the segmented regions). For example, FIG. 4 and Table 3 illustrate the file sizes of the compressed sequences to be smaller by approximately 37% to 55% than the file sizes of the compressed sequences without texture replacement for the movie sequence AMERICAN BEAUTY. The file sizes of the compressed sequences with texture replacement are also smaller than the file sizes of the compressed sequences with the texture replaced by a different texture before encoding. Significant bit rate reduction is also achieved for each of the coding scenarios that was applied. Moreover, as shown by FIGS. 5 and 6, the file sizes of each of the intra-coded frames with the texture removed is smaller than that of the encoded frames with the texture replaced with a new texture before encoding, which is in turn smaller than that of the encoded original frames for the movie sequences AMERICAN BEAUTY and 6 DAYS AND 7 NIGHTS, respectively.

TABLE 3

Bit reduction when coding 100 and 200 frames (respectively) of the movie sequences AMERICAN BEAUTY and 6 DAYS AND 7 NIGHTS. The texture was removed at the encoder and then the frames were encoded using different coding scenarios.

| | Bit rate reduction [%] | | |
|---|---|---|---|
| Movie sequence | First frame intra coded | Every 10th frame intra coded | All frames intra coded |
| AMERICAN BEAUTY | 37.39 | 44.39 | 55.64 |
| 6 DAYS AND 7 NIGHTS | — | 2.08 | 6.37 |

As described above, the parameters of the analyzed texture and the substitution color vector for the segmented regions were sent to the decoding portion of apparatus 300, whereas the boundaries of the segmented regions were not. Instead, the boundaries of the segmented regions were recovered at the decoder decoding portion of apparatus 300 by identifying all of the background regions in the decoded frames that have a color similar to the substitution color. The recovered regions were next processed to evaluate their geometric characteristics—the recovered regions, the centroids of the recovered regions, and the centroids of the original regions were tracked for three frames of the decoded sequence for the movie 6 DAYS AND 7 NIGHTS.

Figure 7:
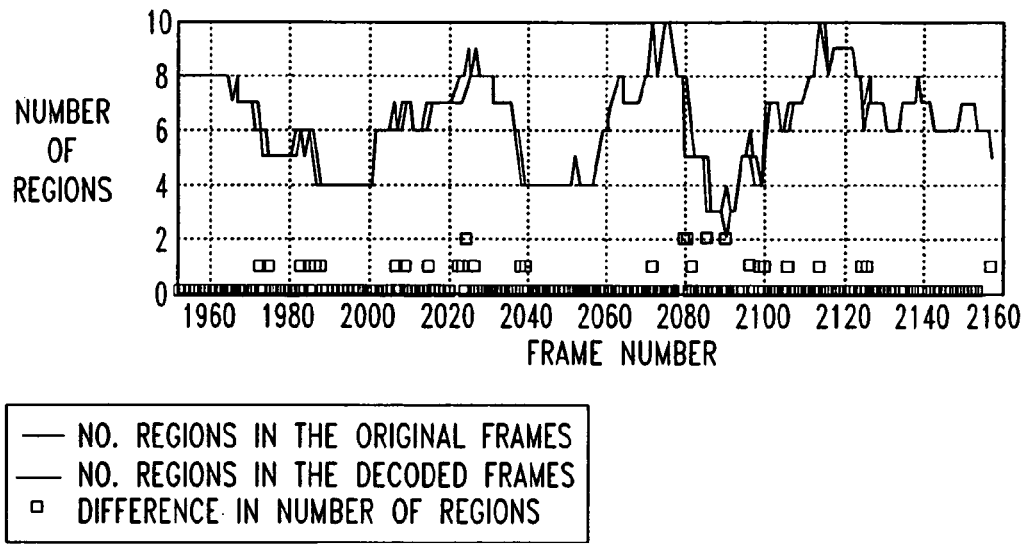
FIG. 7 is a plot showing the number of regions recovered at the decoder, the number of regions identified at the encoder, and their difference per frame for the movie sequence 6 DAYS AND 7 NIGHTS.

For these frames, the difference in number of regions obtained using the decoded and the original frames was determined to be less than, or equal to, two regions. This result is mainly because bigger regions were split into two smaller regions as coding artifacts were introduced. However, this result would not affect the texture mapping process since texture is mapped onto all of the regions. Moreover, as shown by FIG. 7, only a few isolated frames yield such differences (which was at most equal to two regions), whereas all of the other frames of the movie sequence resulted in the detection of the same number of regions in the decoded frames as that in the original frames.

Figure 8:
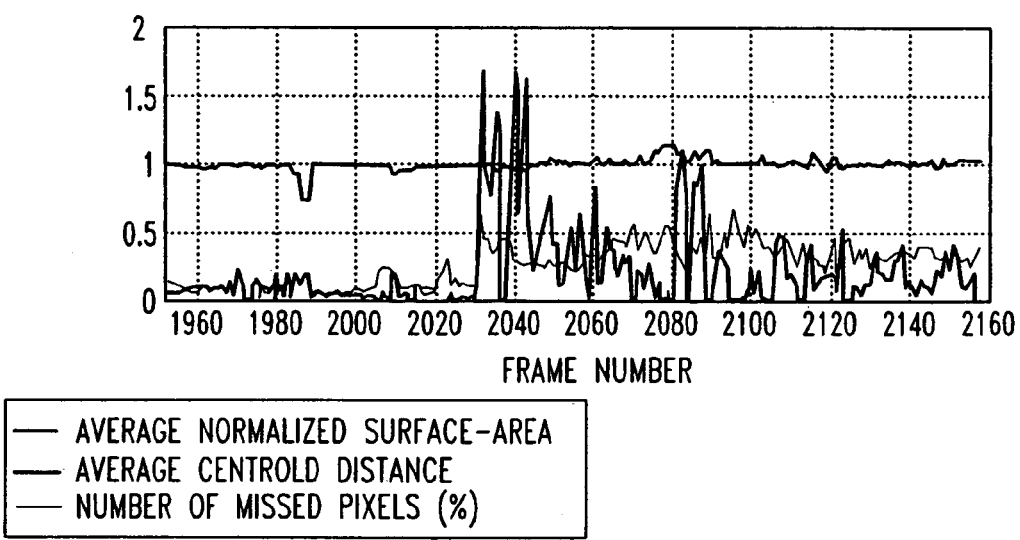
FIG. 8 is a plot showing the number of missed pixels, the average centroid distance, and the average surface-area per frame for the regions recovered using the decoded frames and the regions obtained using the original frames of the movie sequence 6 DAYS AND 7 NIGHTS.

An indication of the effectiveness of the region recovery can also be illustrated by FIG. 8, which shows the number of missed pixels, the average centroid distance, and the average surface-area per frame for the regions recovered using the decoded frames and the regions obtained using the original frames. Surface-areas and the centroid distances for the common regions were computed for frames that yield different numbers of decoded regions as compared to the original regions.

It is noted that the average normalized surface-area is close to one for most of the frames, indicating that the decoded regions have quite similar areas to the original regions. It is also noted that the average centroid distance is very small for most of the frames with the exception of those yielding a different number of regions in the decoded frames from that in the original frames, and that the number of missed pixels is either less than 0.2% or around 0.4% for all of the frames, which indicates that the region recovery process is accurate.

Mapping synthesized texture onto a decoded luminance frame of the movie sequence 6 DAYS AND 7 NIGHTS results in a realistic frame with higher visual quality than that of frames obtained through coding and decoding the original sequence. Similar results have been obtained using the movie sequence AMERICAN BEAUTY. In addition, at the same bit rate, the artifacts that are clearly visible in frames obtained through coding and decoding the original sequence are absent in frames obtained by mapping synthesized texture onto decoded luminance frames of the movie sequences.

Figure 9:
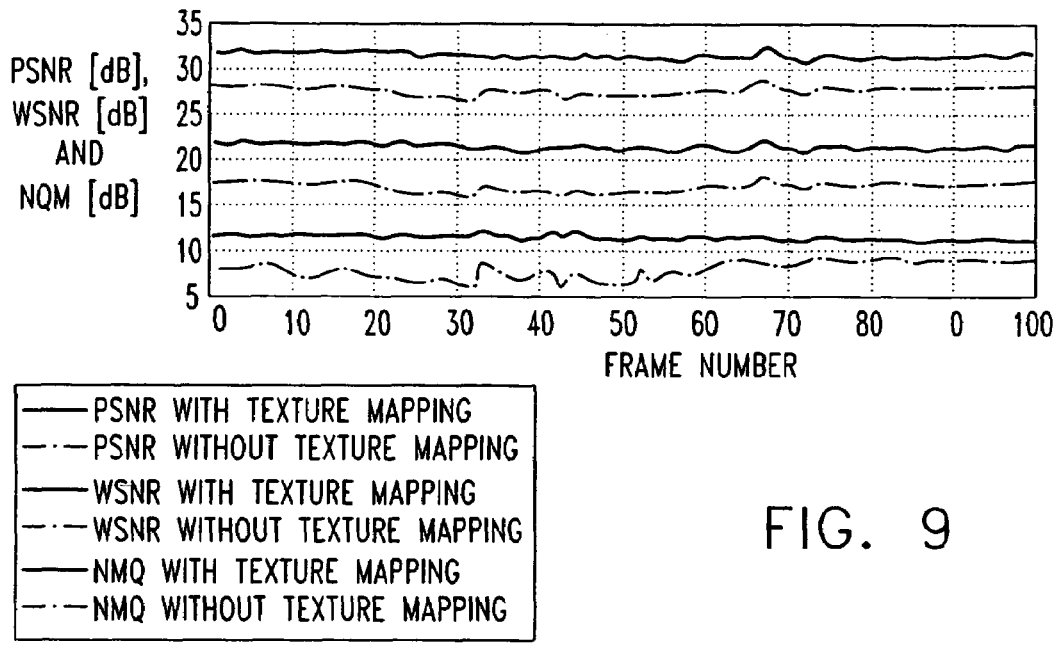
FIGS. 9 and 10 are plots of the PSNR (in dB), WSNR (in dB), and NQM (in dB) values for the decoded YUV frames of the movie sequences AMERICAN BEAUTY and 6 DAYS AND 7 NIGHTS, respectively, with and without texture replacement.
Figure 10:
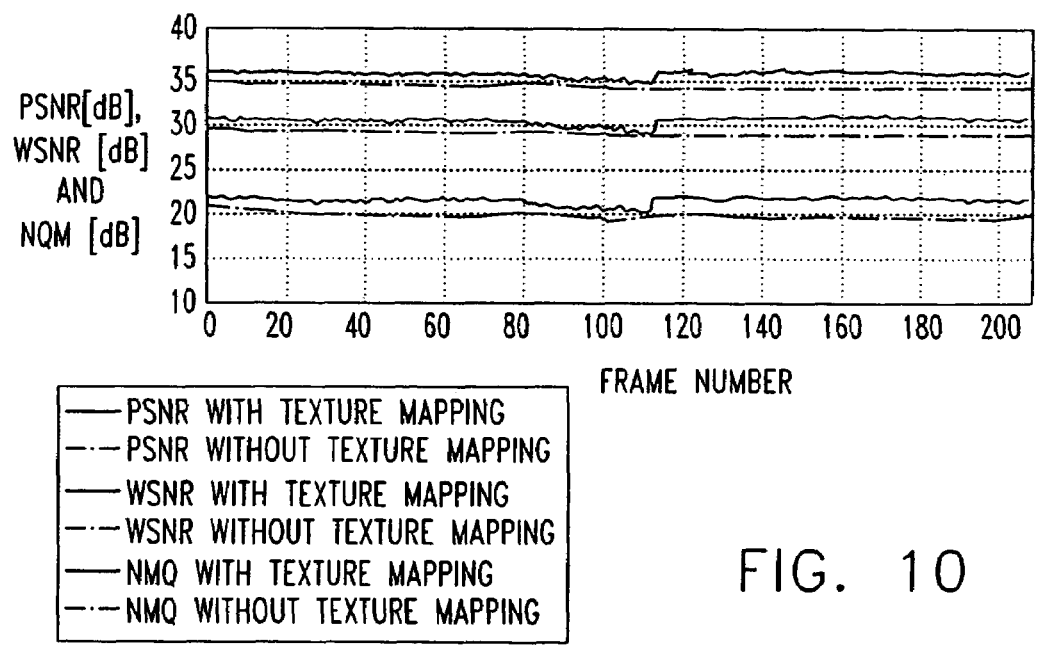
Figure 11:
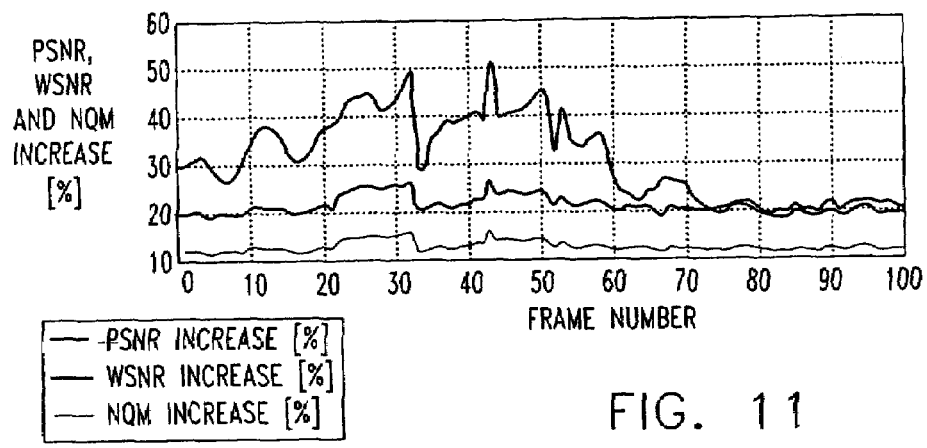
FIGS. 11 and 12 are plots showing the percentage of increase in PSNR, WSNR and NQM values for the decoded YUV frames of the movie sequences AMERICAN BEAUTY and 6 DAYS AND 7 NIGHTS, respectively, as a result of texture replacement.
Figure 12:
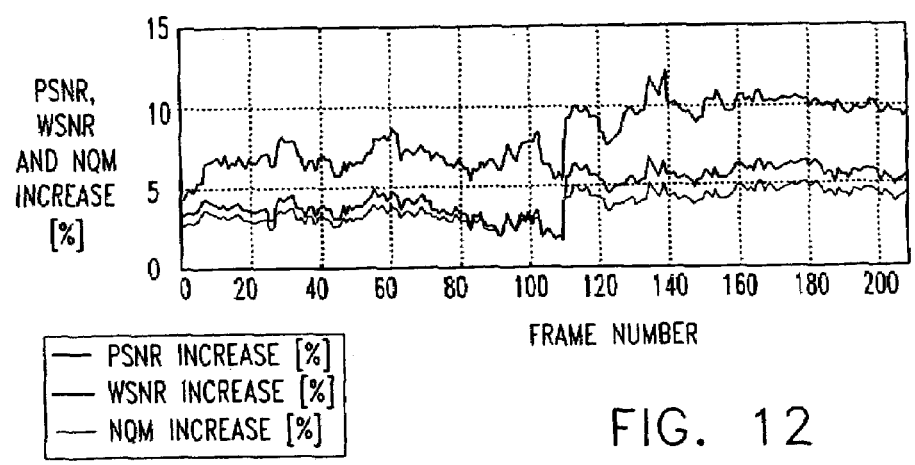

As shown in Table 4, objective evaluation indicates that higher PSNR and WSNR values are obtained for the decoded sequences with texture replacement than that obtained by simply encoding and decoding. Similar results are obtained using subjective-objective evaluation. For example, FIGS. 9 and 10 illustrate that higher NQM values are obtained with decoding sequences with texture replacement than by simply encoding and decoding frames for the movie sequences AMERICAN BEAUTY and 6 DAYS AND 7 NIGHTS, respectively. It is to be noted that in FIGS. 9 and 10, the indices were computed with respect to the frames with the texture substituted by mean color values. FIGS. 11 and 12 show the percentage increases of the PSNR, WSNR and NQM per frame, computed as the ratio between the difference between each index value for frames with texture replacement and frames with mean color and the index value for the frames with texture replacement.

TABLE 4

Mean and standard deviation (Std) of the increase in PSNR, WSNR and NQM values for 200 frames of the movie sequences AMERICAN BEAUTY, and 6 DAYS AND 7 NIGHTS with synthesized and replaced textures that are similar to the original texture

| | | | Texture 1 | | | Texture 2 | | |
|---|---|---|---|---|---|---|---|---|
| Movie | Index sequence | Quantization parameter | PSNR increase [%] | WSNR increase [%] | NQM increase [%] | PSNR increase [%] | WSNR increase [%] | NQM increase [%] |
| AMERICAN BEAUTY | Mean | 23 | 12.400 | 21.010 | 30.875 | — | — | — |
| | Std | | 1.248 | 2.083 | 9.136 | — | — | — |
| 6 DAYS AND 7 NIGHTS | Mean | 23 | 3.764 | 4.637 | 8.237 | 1.605 | 1.637 | 1.095 |
| | Std | | 0.896 | 1.285 | 1.733 | 1.055 | 1.483 | 1.665 |
| | Mean | 25 | 13.155 | 16.513 | 28.759 | 11.475 | 14.234 | 23.787 |
| | Std | | 7.910 | 9.671 | 16.068 | 8.107 | 10.001 | 17.233 |
| | Mean | 27 | 11.726 | 15.019 | 27.166 | 10.348 | 13.105 | 22.761 |
| | Std | | 7.795 | 9.573 | 16.227 | 7.953 | 9.847 | 17.289 |

FIG. 13 is a flowchart outlining steps in a non-limiting and exemplary first method for practicing the invention. Beginning in step 1300, operation continues to step 1320, which includes receiving a signal representing texture information and movie frames which have the texture removed from at least one region. The removal of texture from at least one region of the movie frames could have been accomplished by, but not limited to, processing the original movie frames by region segmentation and texture extraction. The texture information could have been obtained by, but not limited to, analyzing the removed texture from the original movie frames.

Next, in step 1340, the movie frame portion of the received input signals is encoded. The encoding can include, but is not limited to, transforming the movie frames, quantizing the result of the transformation, and performing fixed or variable length encoding. In another implementation, the encoder is operatively arranged to encode the texture information in addition to the movie frames.

In step 1360 an output signal is generated, which can be a single packet combining the encoded movie frames and the texture information, either encoded or non-encoded. Alternatively, the output signal can be outputted through plural channels separately providing the encoded movie frames and the texture information, either encoded or non-encoded. The process proceeds to step 1395 where it terminates.

The signal outputted in step 1360 can be further processed. For example, the output signal can be transmitted through a communication medium (including but not limited to a link or a network) to a decoding apparatus. Alternatively, the output signal can be conveyed to a storage medium.

In various exemplary implementations, the flowchart shown in FIG. 13 can include one or more steps implementing region segmentation, texture extraction, or analysis of the texture removed from the original movie frames, or implementing a combination of two or more of these steps.

FIG. 14 is a flowchart outlining steps in a non-limiting and exemplary second method for practicing the invention. Beginning in step 1400, operation continues to step 1420, which includes receiving a signal representing texture information and encoded movie frames which have the texture removed from at least one region. The removal of texture from at least one region of the movie frames could have been accomplished by, but not limited to, processing the original movie frames by region segmentation and texture extraction. The texture information could have been obtained by, but not limited to, analyzing the texture removed from the original movie frames. The received signal can be a single packet combining the encoded movie frames and the texture information, which is either encoded or non-encoded. Alternatively, the input signal can be received through plural channels separately providing the encoded movie frames and the texture information, either encoded or non-encoded.

Next, in step 1440, the synthesizing of texture is performed. In various exemplary implementations, the texture synthesizing can be based on at least one reference constraint (pre-set or dynamically set) including, but not limited to, for example marginal statistics, coefficient correlations, coefficient magnitude correlations, cross-scale statistics, overall color, and color saturation constraints and any combination of two or more of these constraints. Additionally, in various exemplary implementations, step 1440 can also include decoding encoded texture information received as part of the input signal.

In step 1460, texture mapping is performed, wherein the texture produced in step 1440 is mapped onto decoded movie frames that were encoded after texture was removed from at least one region. The decoding of the encoded movie frames could have included, but is not limited to, performing fixed or variable length decoding and inverse transformation.

Next, in step 1480, a signal is output. The process proceeds to step 1495 where it terminates. In various exemplary implementations, the output signal can be provided for further processing including, but not limited to, displaying movie frames based on the result of the texture mapping.

In various exemplary implementations, the flowchart shown in FIG. 14 can include decoding movie frames that were encoded after texture was removed from at least one region. In such implementations, the received signal includes encoded movie frames that are then decoded. In various exemplary implementations, the flowchart can include receiving encoded texture information, which is then decoded. In such implementations, the decoding can include, but is not limited to, performing fixed or variable length decoding and inverse transformation.

Various exemplary methods of implementing the invention can combine the various methods explained with respect to the flowcharts in FIGS. 13 and 14 to enable one-way or two-way, real-time or delayed data transmission and reception. For example, the invention can be implemented as a transceiving method combining the flowcharts shown in FIGS. 13 and 14. Such a method can be used to connect a transceiver to other transceivers through communication media that include links or networks, or both. Such methods can be used for real-time communication of data packets or for communication delayed by storing and later providing the data packets.

FIG. 15 is a flowchart outlining steps in a non-limiting and exemplary third method for practicing the invention. Beginning in step 1500, operation continues to step 1502, which includes receiving a signal representing movie frames. The signal could be based on stored information or be based on signals obtained from an image detecting apparatus such as, but not limited to, a camera. The input Movie signal can be represented by equation (1).

Next, in step 1504, frames having regions sharing a specific feature are identified. In an exemplary implementation, the feature is color and, as part of step 1504, all background regions bg having color similar to the color of a selected pixel or region of interest are identified.

In step 1506, a reference value C*, which can be a constant or can vary, is substituted for the pixel values (including changing a single or plural pixel component values) in the background regions bgs, which are obtained in step 1504. The resulting movie sequence with the texture removed can be represented by equation (2). Table 1 summarizes, in a non-limiting manner, the methodology used in Dumitras and Haskell, which can be used in implementing steps 1504 and 1506.

Next, in step 1508, the extracted texture is analyzed. In an exemplary implementation, the texture analyzing step decomposes the texture image using the parametric statistical model, which is detailed in Portilla. Table 2 summarizes, in a nonlimiting manner, the operations performed by such an implementation of the texture analyzing step.

In step 1510, the movie frames are encoded after their processing by the texture extracting step 1506. The encoding by step 1510 can include, but is not limited to, transforming the movie frames, quantizing the result of the transformation, and performing fixed or variable length encoding. The texture analyzing step 1508 and the frame encoding step 1510 are followed by a first outputting step 1512. In another implementation, the encoding step 1510 also encodes the texture parameters obtained from the texture analyzing step 1508.

The result of the first outputting step 1512, which can include the encoded movie frames (which have been processed by the texture extracting step 1506) and the texture parameters (whether encoded or non-encoded), can be provided for further processing. Such further processing includes, but is not limited to, storing in a storage medium or transmitting through a communication medium, including free space or guided wave propagation, that forms part of a link or network, or both. The encoded movie frames and texture parameters can be provided through separate channels or can be combined to form single or plural information packets.

The first outputting step 1512 is followed by step 1522, which receives the encoded movie frames and texture parameters. The receiving step 1522 is followed by the decoding step 1524, which includes decoding the encoded movie frames by at least performing fixed or variable length decoding and inverse transforming. In various implementations, the decoding step 1524 also decodes encoded texture parameters.

Decoding step 1524 can also include recovering the boundaries of the texture-replaced regions by, for example, identifying all background regions having a color identical to the substitution color, C*. For robustness with respect to artifacts (color changes) that may be introduced by the encoding and decoding process, preferably the decoding step 1524 preferably includes replicating the color-based region segmentation technique employed by the region segmenting step 1504. The exemplary implementation by the region segmentation step 1504, however, is modified by obtaining the angular and modulus maps with respect to the substitution color vector sent by the encoder, instead of computing the angular and modulus maps with respect to a color vector representing a region-of-interest. The resulting movie sequence after recovery of the boundaries of the texture-replaced regions can be represented by equation (3). In various implementations, the decoding step 1524 also decodes received texture parameters that are encoded.

The receiving step 1522 can also be followed by step 1526. In step 1526, texture that can be either different from or similar to the original texture is synthesized based on the received texture parameters. In an exemplary implementation, the texture synthesizing component 326 is arranged to synthesize a texture that is then mapped onto the regions whose boundaries were recovered. The texture synthesizing component 326 can synthesize texture that is artifact-free.

In various exemplary implementations, the texture synthesizing step 1526 can synthesize texture that is similar to the original texture by, for example, using the same dominant texture orientation, overall color, and color saturation. In such implementations, the texture synthesizing step 1526 ensures better visual quality of the mapped regions than that obtained by encoding and decoding the original movie frames, but without the inventive texture replacement approach as described herein. Alternatively, in various exemplary implementations, the texture synthesizing step 1526 can synthesize texture that is different from the original texture by, for example, using at least one, or a combination of, dominant texture orientation, overall color, and color saturation that is different (pre-set or dynamically set) from that in the original texture. In various exemplary implementations, the method proposed in Portilla, which is explicitly incorporated herein by reference in its entirety and for all purposes, is used. The texture synthesizing step 1526 can be implemented using any one of constraints described herein.

Various implementation of the texture synthesizing step 1526 can preferably include overall color constraints or color saturation constraints, or both. For example, within a region, the texture in the chrominance frames can be replaced with the corresponding mean color, which are preserved since synthesized texture is mapped only on the luminance frame. Additionally, it is noted that the synthesized texture would have the same mean color as that of the replaced region. Implementing constraints on overall color and/or color saturation aids in improving the subjective evaluation by users of the similarity in color patterns. Additionally, various exemplary implementations of the texture synthesizing step 1526 preferably use a combination of any two or more of the constraints described above.

In various implementations, the texture synthesizing step 1526 also decodes received texture parameters that are encoded.

Next, in step 1528, the synthesized texture is mapped onto the decoded frames and is performed based on the results of the decoding step 1524 and the texture synthesizing step 1526. In various implementations, simple placement of the synthesized texture and blending around edges can be performed using gray level masks of the recovered regions, obtained by lowpass filtering the bi-level versions of the recovered regions. In various implementations of the texture mapping step 1528, frontal-parallel images can be used without meshes or mip-mapping. However, other implementations of the texture mapping step 1528 can additionally employ meshes and/or mip-mapping. The result of the texture mapping step 1528 can be represented by equation (4). It is to be noted that mapping and blending can be used in order to generate mapped background regions that are identical neither to the recovered regions nor to the original regions.

Next, in step 1530, a signal based on the texture mapping step 1528 is output. The process proceeds to step 1595 where it terminates. In various exemplary nonlimiting implementations, the output provided by step 1528 can be further processed to display movie frames.

The signal generating and processing devices 100-300 are, in various exemplary embodiments, each implemented on a programmed general-purpose computer. However, these devices can each also be implemented on a special purpose computer, a programmed microprocessor or microcontroller and peripheral integrated circuits, an ASIC or other integrated circuit, a digital signal processor, a hardwired electronic or logic circuit such as a discrete element, a programmable logic device such as a PLD, PLA, FPGA or PAL, or the like. In general, any device capable of implementing a finite state machine that is in turn capable of implementing the flowcharts shown in FIGS. 13-15 can be used to implement the signal generating and processing devices 100-300.

It should be understood that the components depicted in FIGS. 1-3 can be implemented as hardware circuits or modules, or software modules, routines, or applications, and that each of the components, modules, or routines shown in FIGS. 1-3 and 13-15 can be implemented as portions of a suitably programmed general purpose computer. Alternatively, each of the circuits, modules, routines, or applications shown in FIGS. 1-3 and 13-15 can be implemented as physically distinct hardware circuits within an ASIC, or using a FPGA, a PDL, a PLA, a PAL or a digital signal processor, or using discrete logic elements or discrete elements. The particular form each of the circuits, modules, routines, or applications shown in FIGS. 1-3 and 13-15 will take is a design choice and will be obvious and predicable to those skilled in the art.

For example, the modules can be implemented as carrier waves carrying control instructions for performing the steps shown in FIGS. 13-15 and the segments of this disclosure describing in more detail the various exemplary implementations. In addition, the separate components of the devices 100-300 can each be integrated together into a single apparatus. Various exemplary implementations may be rendered more compact by avoiding redundancies in constituent components—for example, by having one memory component or module. For example, the exemplary devices depicted by FIGS. 1-3 can be modified so that a single processor replaces several, and possibly all, of the components and performs their functions, either serially or in parallel. Various other exemplary implementations may retain redundancies to enable parallel processing, for example.

Additionally, in terms of efficiency, the texture analyzing components can be ideally as fast as possible, while the texture synthesizing components may be more computationally intensive. Indeed, the texture synthesizing components can be quite computationally intensive if the size of the synthesized texture is large (for instance, equal to the size of the luminance frames). Then, to reduce the CPU time required by the texture synthesis stage, the size of the synthesized texture can be reduced such that it is equal to the largest bounding box of a segmented region within the video frame. Next, preferably, the synthesized texture can be centered in the centroid of each of the segmented regions when performing texture mapping. To further improve the efficiency of the texture synthesis stage in a real-time decoder implementation, DSP processing can be used to good advantage.

It is to be noted that the accuracy of the region segmentation at the encoder can have an important impact on the bit rate of the compressed sequences with texture removal, and on the visual quality and artistic message conveyed by the decoded movie sequences with texture replacement. Additionally, it is to be noted that the accuracy of the region segmentation stage can influence the visual quality of the decoded sequences with texture replacement.

While this invention has been described in conjunction with the exemplary embodiments outlined above, it is evident that many alternatives, modifications, and variations will be apparent to those skilled in the art. For example, although this disclosure describes the invention as applied to a sequence of movie frames, one of ordinary skill in the art would know in light of this disclosure to apply this invention (including the various apparatus and method embodiments and their various implementations) to a single still image. Additionally, the invention described herein can be used in various applications including, but not limited to, video phones, video conferencing, and streaming video. Accordingly, the exemplary embodiments of the invention, as set forth above, are intended to be illustrative, not limiting. Various changes may be made without departing from the spirit and scope of the invention. For example, any of the implementations of the present invention that are described above can be further augmented by performing motion-based segmentation in addition to the color-based segmentation.

What is claimed is:

1. A computer-implemented method for processing images having texture, the method comprising:
   Using a processor to perform the following steps:
      identifying similar texture regions in a video sequence;
      extracting texture from the similar texture regions to obtain a video sequence with the texture removed and texture parameters wherein a resulting video sequence with texture extracted is represented by an equation in which a first background region is unmodified and a second background region is modified by texture extraction, wherein the texture parameters are represented by a reference value $C^*$, which represents an extracted texture and a color; and
      encoding the video sequence with the texture removed.

2. The computer-implemented to claim 1, further comprising outputting on a first channel the encoded video sequence and outputting on a second channel the texture parameters.

3. The computer-implemented of claim 1, wherein the encoding is performed using low bit-rate coding.

4. The computer-implemented of claim 1, wherein the video sequence is encoded using intra-coding, predicted coding or bidirectionally predicted coding based at lease in part on the texture.

5. The computer-implemented of claim 1, wherein encoding the video sequence occurs without the use of region shape parameters.

6. The computer-implemented of claim 1, further comprising:
   encoding the texture parameters.

* * * * *